(12) United States Patent
Werquin et al.

(10) Patent No.: US 10,605,199 B2
(45) Date of Patent: Mar. 31, 2020

(54) CYLINDER WITH INTEGRATED LOCKING

(71) Applicant: SAFRAN ELECTRONICS & DEFENSE, Boulogne Billancourt (FR)

(72) Inventors: Mickael Werquin, Boulogne Billancourt (FR); Julien Hautecoeur, Boulogne Billancourt (FR); Christophe Bastide, Boulogne Billancourt (FR); Pascal Omnes, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 16/491,114

(22) PCT Filed: Feb. 23, 2018

(86) PCT No.: PCT/EP2018/054574
§ 371 (c)(1),
(2) Date: Sep. 4, 2019

(87) PCT Pub. No.: WO2018/162259
PCT Pub. Date: Sep. 13, 2018

(65) Prior Publication Data
US 2020/0018259 A1  Jan. 16, 2020

(30) Foreign Application Priority Data

Mar. 6, 2017 (FR) ..................................... 17 51772

(51) Int. Cl.
*F02K 1/76* (2006.01)
*F15B 15/26* (2006.01)
(Continued)

(52) U.S. Cl.
CPC .............. *F02K 1/763* (2013.01); *F02K 1/766* (2013.01); *F15B 15/261* (2013.01);
(Continued)

(58) Field of Classification Search
CPC .................................. F02K 1/766; F02K 1/763
See application file for complete search history.

(56) References Cited

U.S. PATENT DOCUMENTS

| 5,448,884 | A | * | 9/1995 | Repp | ......................... F02K 1/76 239/265.31 |
|---|---|---|---|---|---|
| 2003/0066284 | A1 | | 4/2003 | Chakkera et al. | |
| 2017/0292474 | A1 | * | 10/2017 | Davies | .................... F02K 1/625 |

FOREIGN PATENT DOCUMENTS

| FR | 2 989 740 A1 | 10/2013 |
|---|---|---|
| WO | WO 2014/147247 A1 | 9/2014 |

* cited by examiner

*Primary Examiner* — Andrew H Nguyen
(74) *Attorney, Agent, or Firm* — Muncy, Geissler, Olds & Lowe, P.C.

(57) ABSTRACT

A lockable actuator includes: a body; a screw for pivoting relative to the body; a nut engaged on the screw so as to move along the screw between an over-retracted first position and a deployed second position on opposite sides of a retracted third position; a sleeve constrained to rotate with the screw and slidably mounted thereon in order to be moved by the nut; and an obstacle secured to the sleeve and a pawl capable of passing collectively between an active state and an inactive state, the pawl and the obstacle being arranged in such a manner that the pawl in its active state can co-operate with the obstacle only after the nut has been moved through a predetermined distance from its third position towards its second position.

12 Claims, 14 Drawing Sheets

(51) Int. Cl.
*F16D 121/22* (2012.01)
*F16H 25/22* (2006.01)
*F15B 15/14* (2006.01)
*F16H 25/24* (2006.01)

(52) U.S. Cl.
CPC .. *F15B 2015/1495* (2013.01); *F16D 2121/22* (2013.01); *F16H 25/2204* (2013.01); *F16H 25/2454* (2013.01)

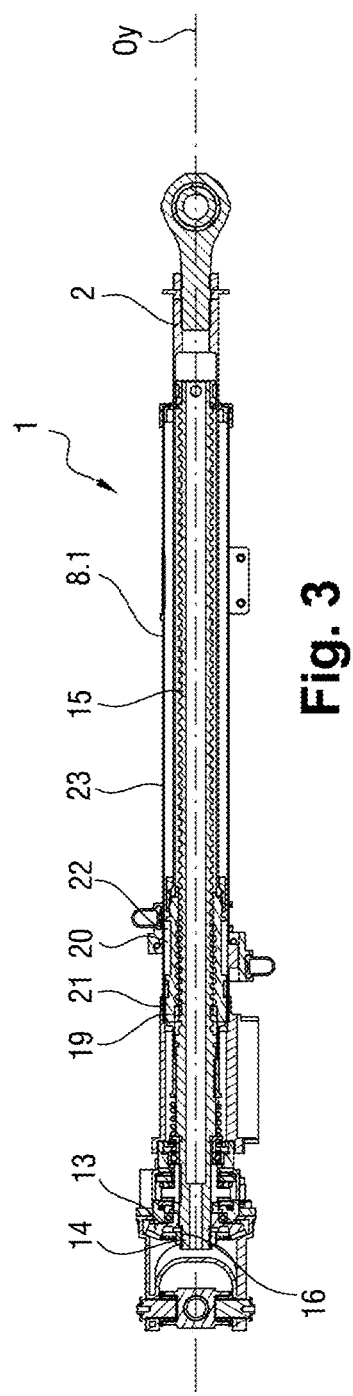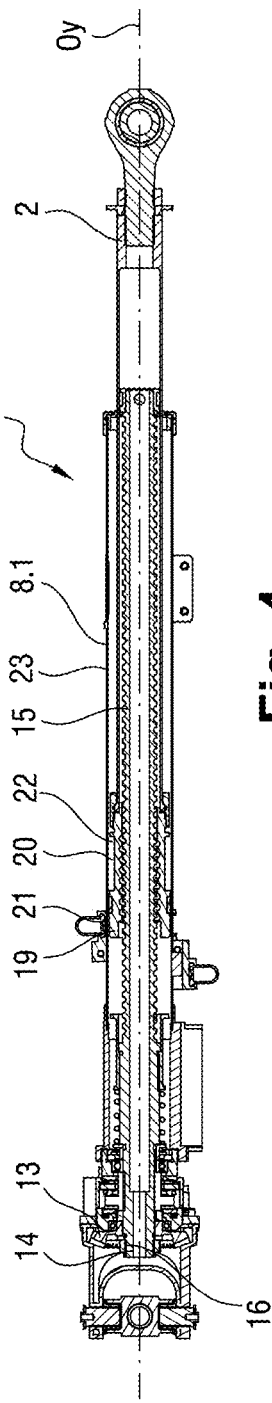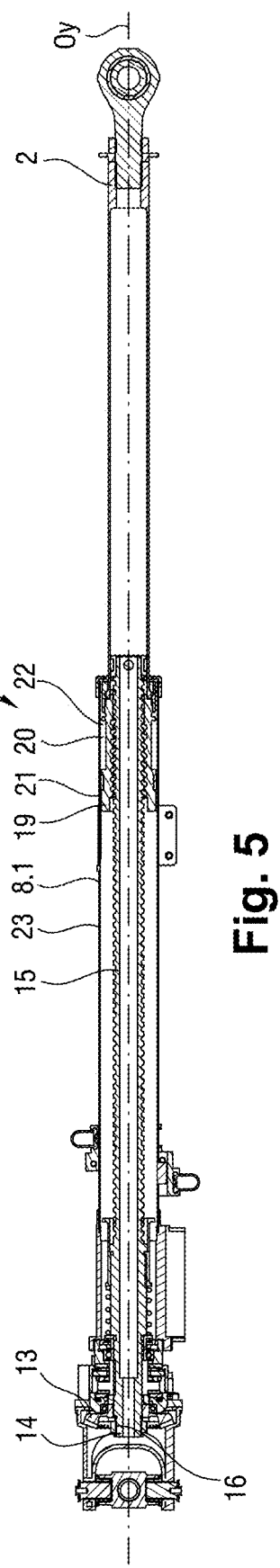

CYLINDER WITH INTEGRATED LOCKING

FIELD OF THE INVENTION

The present invention relates to the field of aviation actuators, and more particularly lockable thrust reverser actuators for jets, and more particularly for turbojets.

BACKGROUND OF THE INVENTION

In a conventional system for reversing the thrust of a turbojet, the nacelle of the turbojet is provided with movable surfaces that can be deployed so as to cause a portion of the gas stream produced by the turbojet to be sent back towards the front. Deploying movable surfaces serves in particular to reduce distances required for landing. Each movable surface is deployed by means of an actuator and includes a main locking device having redundant locks for connecting the movable surface to the nacelle in order to avoid any accidental deployment of the movable surface.

Traditionally, movable surfaces are deployed by means of hydraulic actuators, which have the advantage of remaining in position so long as the pressure in the chambers of the actuator remain the same.

Proposals have been made to equip thrust reversers with electrical actuators that replace hydraulic actuators. Such an electrical actuator comprises a body and an electric motor for driving a ball screw in rotation. The ball screw comprises a screw mounted on the body to pivot and a nut engaged on the screw. The nut is provided with connection means connecting it to the movable surface and it can move from a retracted first position in which the movable surface is closed to a deployed second position in which the movable surface deflects at least a portion of the stream from the jet.

Generally, the actuators for a movable surface can also adopt an "over-retracted" third position that is reached after moving along a retraction overtravel. When the nut is in its over-retracted third position, it holds the movable surface beyond its retracted position, the movable surface then lightly compressing the gaskets of the nacelle that co-operate with the movable surface, thereby enabling the locks of the main locking device (also known as a primary lock system (PLS)) to be disengaged so as to enable subsequent deployment of the movable surface.

Nevertheless, when the motor drive of the actuator is not powered, a force applied directly to the movable surface might cause it to move (impact, vibration, air pressure under the effect of the relative wind or of the stream from the jet).

Since the consequences of undesired deployment of a movable surface of a thrust reverser are classified as being catastrophic, it is required to add an additional locking device. Proposals have been made to add an additional lock on the movable surface and also a dedicated locking-and-unlocking actuator. Since the nacelle contains a large number of mechanisms, integrating an additional lock plus actuator assembly is difficult and gives rise to extra weight. Furthermore, those elements need to be protected thermally, and they need to be designed in such a manner as to avoid generating vibration and to have a dedicated control system. All of these constraints increase the weight and the size of the equipment, thereby constituting a brake on the use of electrical actuators for thrust reverser.

OBJECT OF THE INVENTION

An object of the invention is to reduce the weight and the size of a device for locking an element moved by an electromechanical actuator.

SUMMARY OF THE INVENTION

To this end, there is provided a lockable actuator comprising a body, a screw mounted on the body to pivot relative to the body about a longitudinal axis, and a nut provided with connection means for connection to an element for moving and engaged on the screw so as to move along the screw between an over-retracted first position and a deployed second position on opposite sides of a retracted third position. The actuator also comprises a sleeve constrained to rotate with the screw and slidably mounted thereon in order to be moved by the nut. The actuator also comprises an obstacle secured to the sleeve and a pawl that is mounted to move on the body and that is connected to a declutching actuator in order to control the pawl to take up an active state and an inactive state, the pawl having a blocking portion for co-operating with the obstacle in order to block turning of the screw in a first direction of rotation when the pawl is in its active state. According to the invention, the pawl and the obstacle are arranged in such a manner that the pawl in its active state can co-operate with the obstacle only after the nut has been moved through a predetermined distance from its third position towards its second position.

This limits stresses on the locking pawl and its declutching actuator to a single escape per opening and closing cycle of the movable surface. This serves to provide the device with good robustness without any need to overdimension the pawl and/or its actuator.

The passive safety of the actuator is improved when the declutching actuator has means for returning it to its active state in the event of the declutching actuator not being powered.

Advantageously, the declutching actuator comprises an electromagnet.

Also advantageously, the screw includes an abutment limiting movement in translation of the sleeve.

Manufacture of the actuator is simplified when the sleeve has fluting for co-operating with grooves of the screw.

Advantageously, the actuator includes return means for returning the sleeve into position. Most advantageously, these return means comprise a helical spring.

Also advantageously, the sleeve, the pawl, and the declutching actuator are arranged so as to allow the nut to move freely from a position lying between the deployed second position and the retracted third position towards the retracted third position, and to enable the pawl to be automatically in its active state when the nut passes to its retracted third position without any need to power the declutching actuator.

The invention also provides a jet nacelle including at least one actuator of any of the above types.

Other characteristics and advantages of the invention appear on reading the following description of a particular, non-limiting embodiment of the invention.

BRIEF DESCRIPTION OF THE DRAWINGS

Reference is made to the accompanying figures, in which:

FIG. 3 is a diagrammatic section view of the actuator of the invention in the over-retracted position;

FIG. 4 is a diagrammatic section view of the actuator of the invention in the retracted position;

FIG. 5 is a diagrammatic section view of the actuator of the invention in the deployed position;

FIGS. 8 to 12 are fragmentary diagrammatic detail views in perspective of the actuator of the invention in particular configurations;

DETAILED DESCRIPTION OF THE INVENTION

Figure 1:
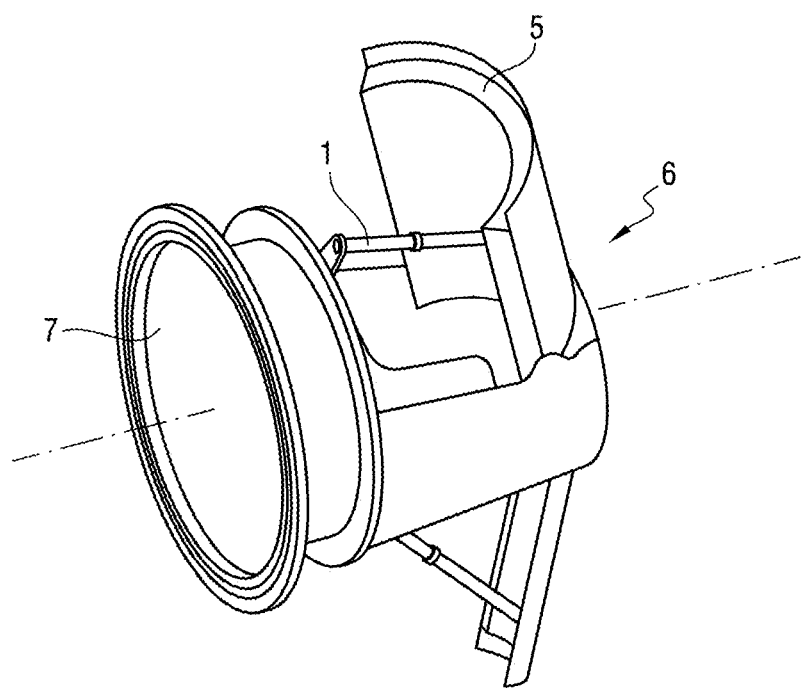
FIG. 1 is a diagrammatic perspective view of a nacelle provided with an actuator of the invention.
Figure 2:
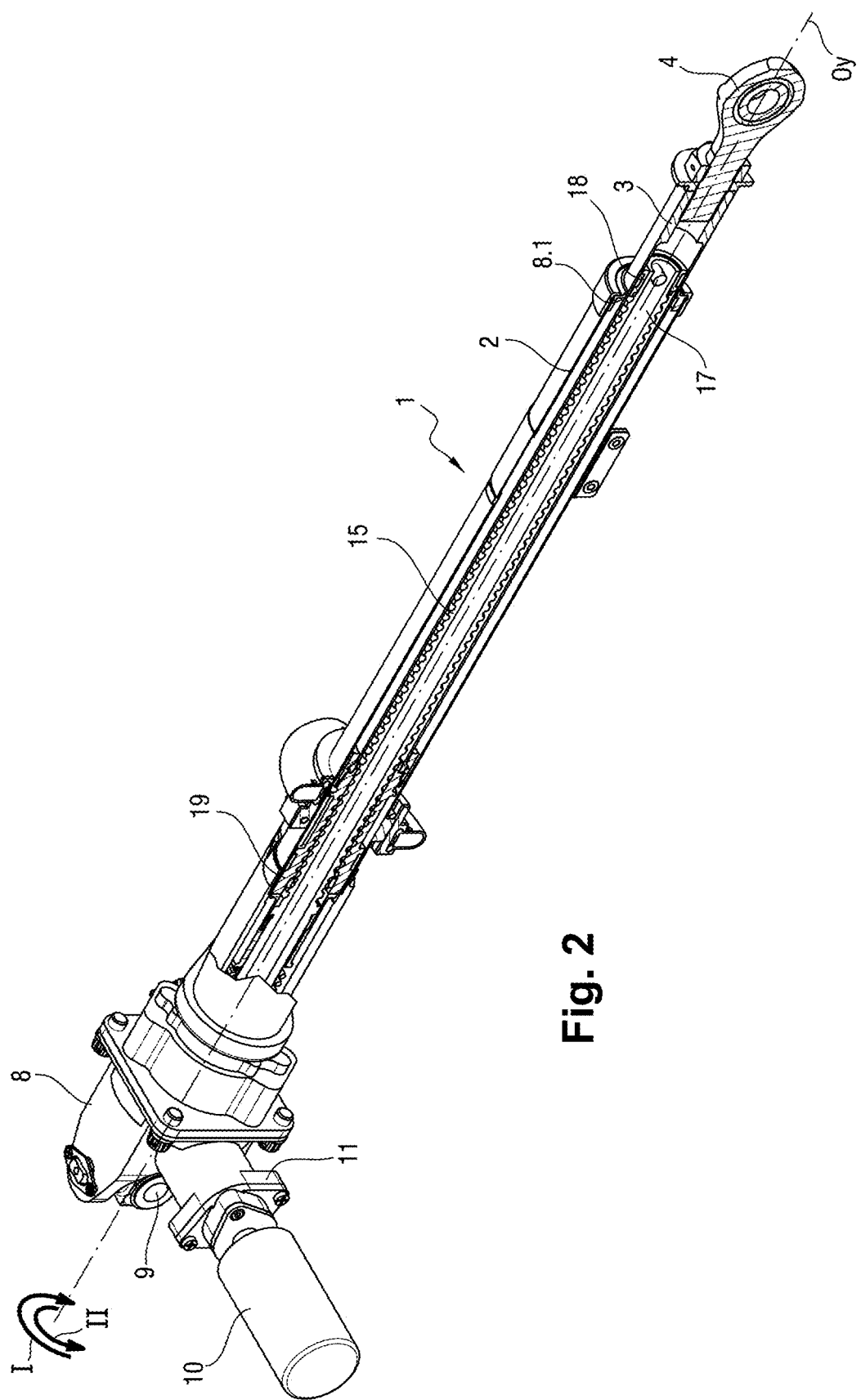
FIG. 2 is a diagrammatic perspective view of an actuator of the invention.

With reference to FIGS. 1 to 12, the lockable actuator of the invention, given overall reference 1, comprises an extension tube 2 having a first end 3 with a ball clevis 4 connected to a movable surface 5 of a thrust reverser 6 of a turbojet nacelle 7. The body 8 of the actuator 1 comprises a universal joint 9 hinging the actuator 1 to the turbojet nacelle 7 and a sheath 8.1 in which the extension tube 2 slides between an over-retracted first position (shown in FIG. 3) and a deployed second position (shown in FIG. 5). FIG. 4 shows a retracted third position situated between the over-retracted first position of FIG. 3 and the deployed second position of FIG. 5.

The actuator 1 is connected to a motor 10 by a coupling flange 11 secured to a bevel gear 12 meshing with a bevel gear 13. A fluted first end 14 of a tubular ball screw 15 of pitch p is mounted in a grooved central bore 16 of the gear 13. The screw 15 extends along a longitudinal axis Oy and possesses a second end 17 provided with a ferrule 18 co-operating with the inside of the extension tube 2 in order to guide sliding along the longitudinal axis Oy. A ball nut 19 is engaged on the screw 15. A first groove 20 made in the outside face 21 of the nut 19 receives a key 22 that co-operates with a second groove 23 of the sheath 8.1, thereby preventing the nut 19 from turning relative to the screw 15. The nut 19 is also connected by a claw 24 connecting it to a second end 25 of the extension tube 2.

The screw 15 is rotatably mounted on the body 8 by a bearing 26. Thus, rotation of the screw 15 in a first direction (represented by arrow I in FIG. 2) serves to move the nut 19 on the screw 15 between an over-retracted first position of the nut 19 and a deployed second position of the nut 19 that are located on either side of a retracted third position of the nut 19. The first, second, and third positions of the nut correspond respectively to the over-retracted first position of the extension tube 2 (shown in FIG. 3), to the deployed second position of the extension tube 2 (shown in FIG. 5), and to the retracted third position of the extension tube 2 (shown in FIG. 4).

The distance between the over-retracted first position of the nut 19 and the retracted third position of the nut 19 is referred to as retracted overtravel and is written $C_{over}$.

Figure 6:
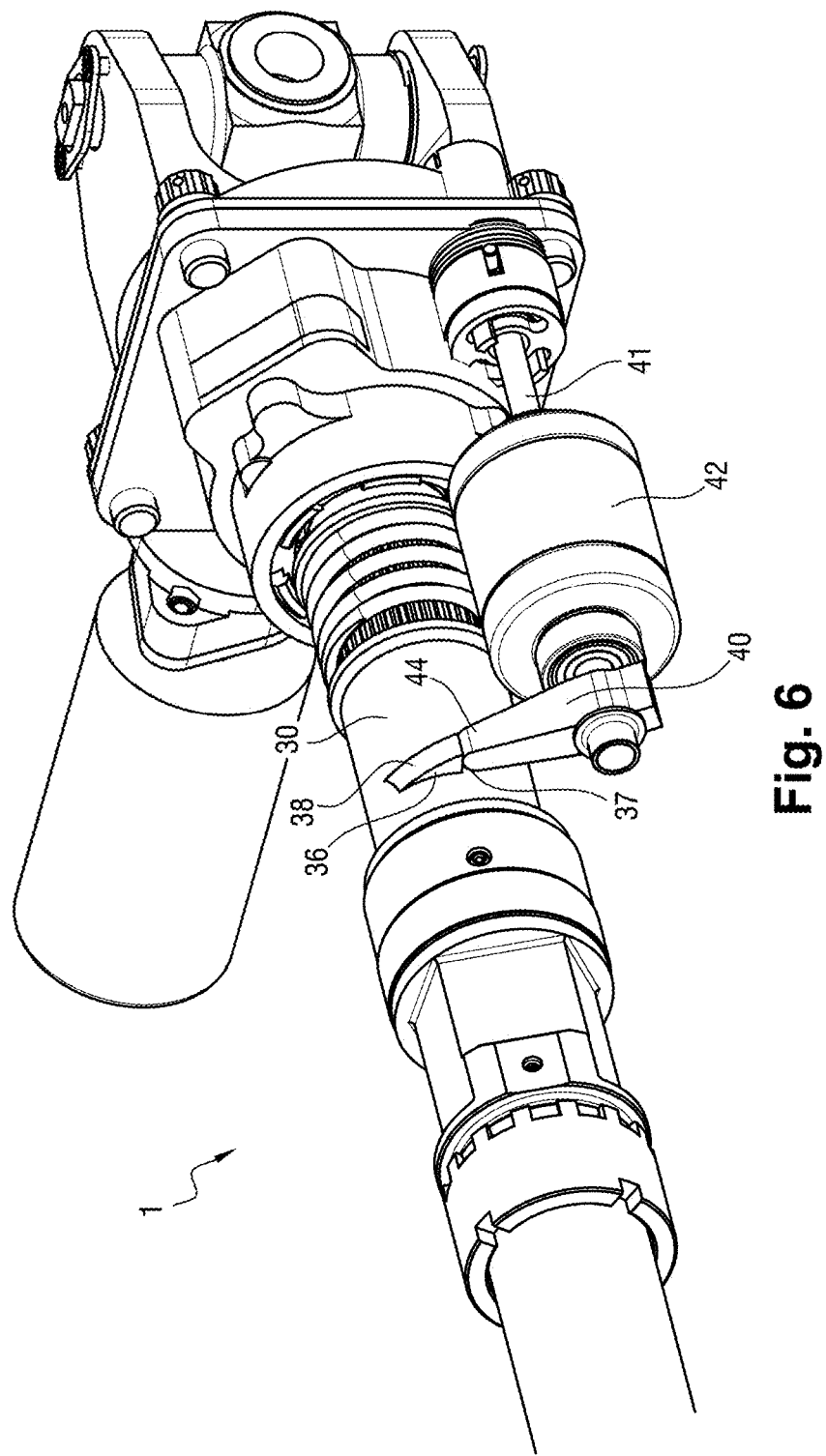
FIG. 6 is a fragmentary detail view in perspective of the actuator of the invention in a blocking configuration.
Figure 8:
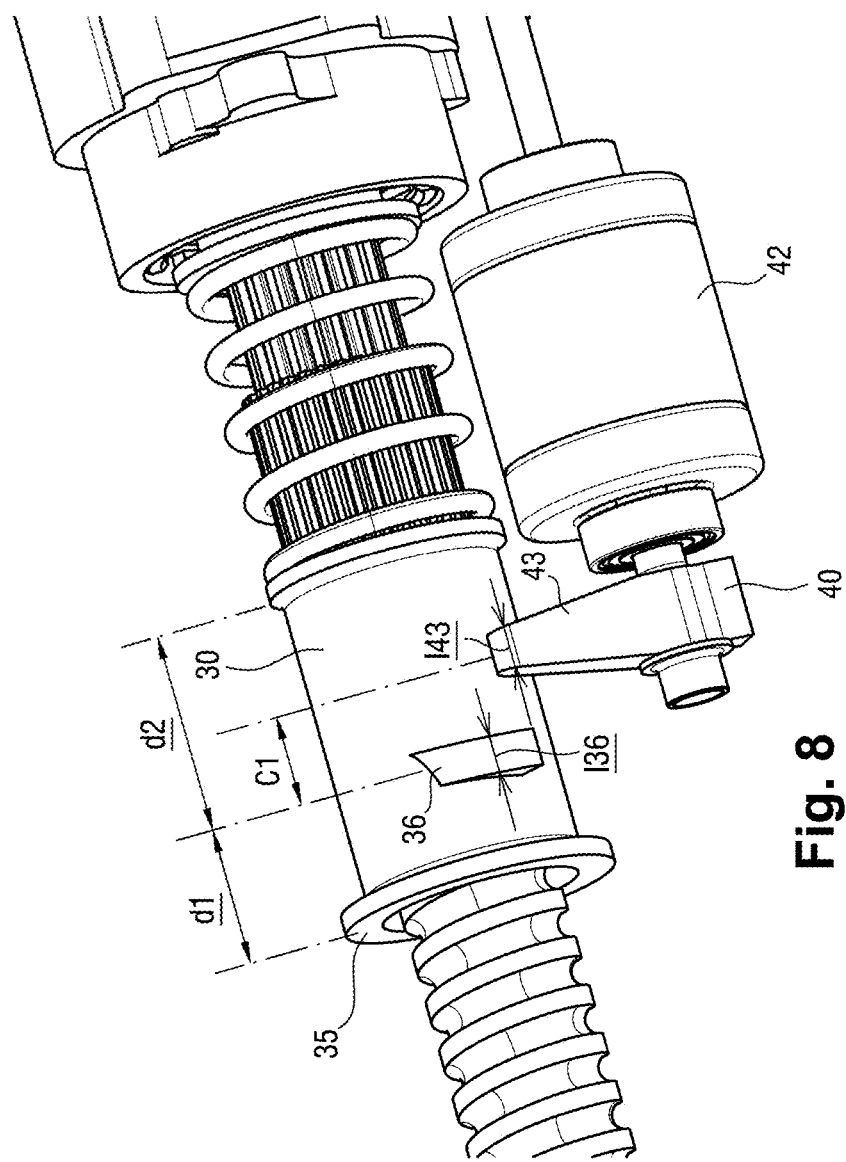
FIG. 8 is a fragmentary detail view in perspective of the actuator of the invention in a first particular configuration.
Figure 9:
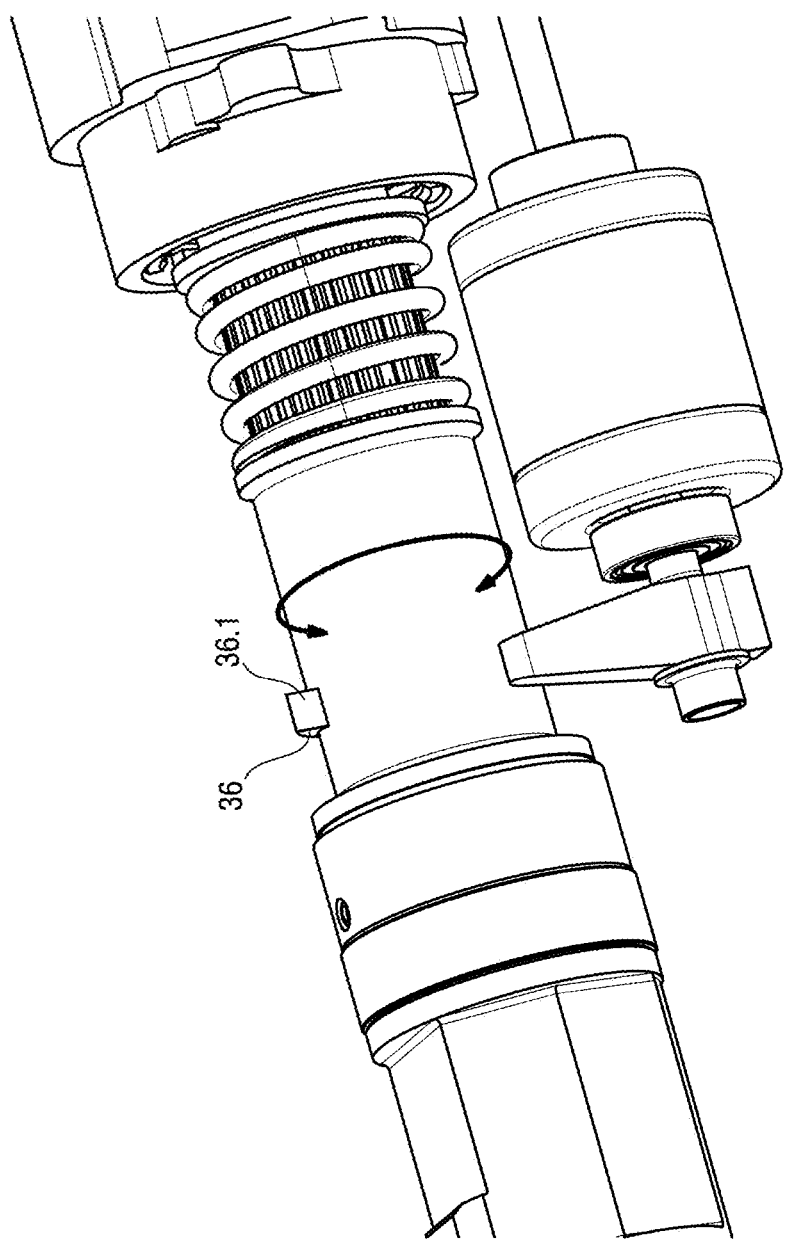

As can be seen in FIG. 6, the actuator 1 has a cylindrical sleeve 30 with an inside bore 31 having a smooth portion 31.1 and a grooved portion 31.2 for co-operating with fluting 27 of a portion 28 of the first end 14 of the screw 15. The smooth portion 31.1 and the grooved portion 31.2 of the sleeve are separated from each other by an inside shoulder 31.3. The sleeve 30 is thus constrained to rotate with the screw 15 and it can slide on the screw over a total stroke L that is defined firstly by the body 8 of the actuator 1 and secondly by an annular abutment 29 of the screw 15. A helical compression spring 32 extends between the body 8 and a first end 33 of the sleeve 30 and pushes the sleeve 30 towards the second end 17 of the screw 15 until the shoulder 31.3 comes into contact with the abutment 29. This position is shown in FIG. 8 and it is adopted by the sleeve 30 when the nut 19 is between its retracted third position and its deployed second position. The second end 34 of the sleeve 30 has an annular shoulder 35 against which an end 19.1 of the nut 19 can come to bear.

An obstacle, in this example in the form of a tooth 36, is secured to the sleeve 30 and projects radially therefrom. The tooth 36 has a first blocking face 37 having a width $l_{37}$ and that extends in a plane containing the longitudinal axis Oy, and it has an escape second face 38 that is curved. The axis of the tooth 36 lies at a distance $d_1$ from the shoulder 35 and at a distance $d_2$ from the first end 33 of the sleeve 30.

Figure 7A:
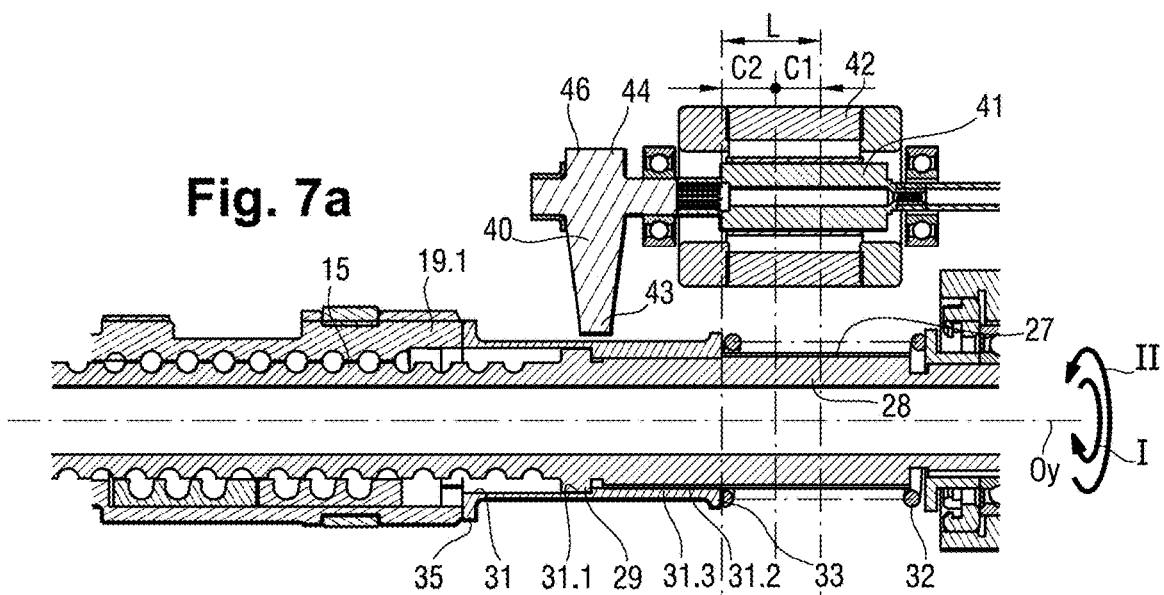
FIGS. 7a, 7b, and 7c are fragmentary diagrammatic views in section of the actuator of the invention in remarkable configurations.
Figure 7B:
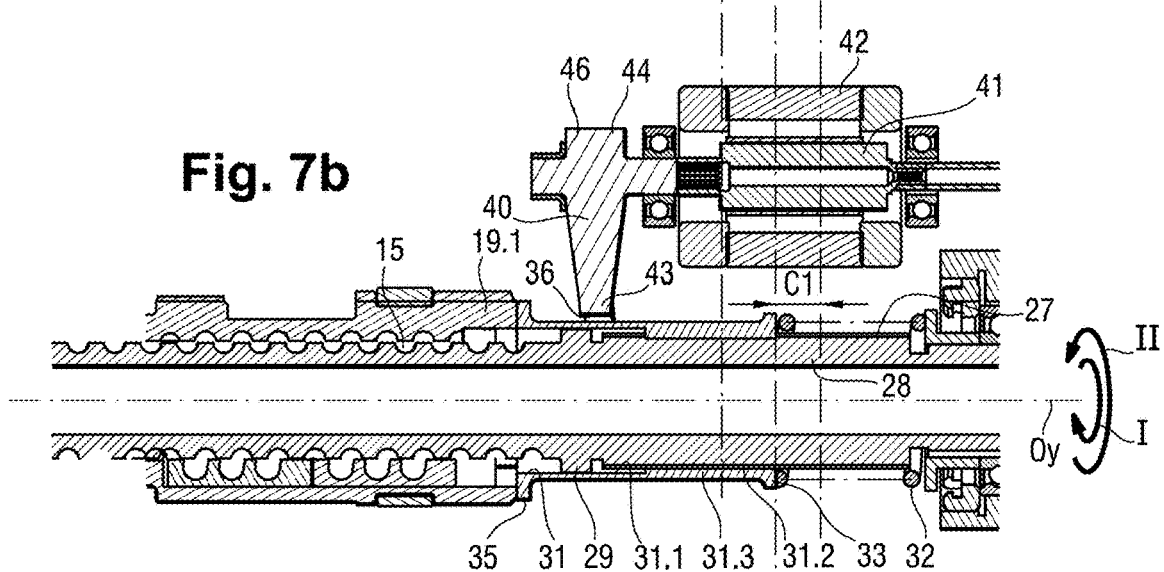
Figure 7C:
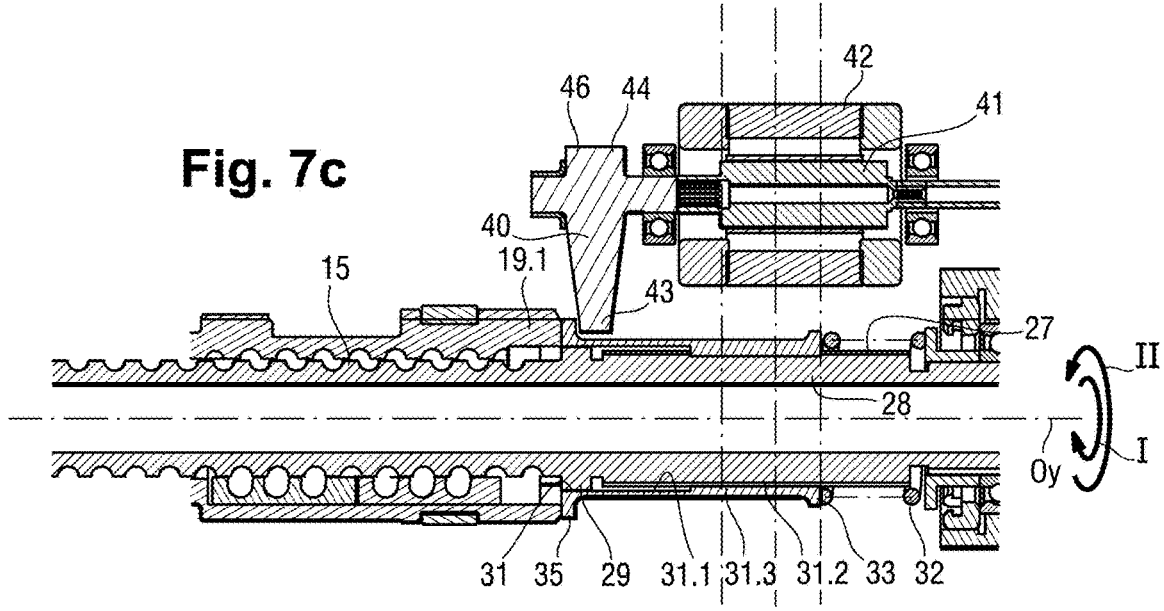

The actuator 1 has a pawl 40 constrained to rotate with the first end 41.1 of a shaft 41 extending parallel to the longitudinal axis Oy and passing through an electromagnet 42. The second end 41.2 of the shaft 41 has a grooved bushing 50 of structure that is described below. A position return device, in this example a spring blade (not shown), brings the pawl 40 into an active position in which a blocking portion 43 situated at the first end 44 of the pawl 40 comes into contact with the sleeve 30 (FIGS. 6 to 8), (in this example the blocking portion 43 is of width $l_{43}$ that is substantially equal to the width $l_{37}$ of the first blocking face 37). When the pawl is in this active position, the blocking portion 43 can co-operate with the blocking first face 37 of the tooth 36 and block rotation of the sleeve 30 (and thus of the screw 15) in the first direction of rotation I (FIG. 7b). In this position, the respective midplanes of the blocking portion 43 of the pawl and of the blocking first face 37 of the tooth 36 are in alignment. This position for blocking the sleeve 30 (corresponding to a blocking fourth position of the nut 19) is reached (FIG. 7b) after the sleeve 30 has moved along a first portion of the stroke $C_1$ from the position it occupies when the nut 19 is in its over-retracted second position (FIG. 3 and FIG. 7c). The sleeve 30 then moves along a second stroke portion $C_2$ before coming against the annular abutment 29 of the screw 15 (FIG. 7a). The total stroke L of the sleeve 30 is thus equal to the sum of the first stroke portion $C_1$ plus the second stroke portion $C_2$. In the event of the screw 15 turning in a second direction of rotation II opposite to the first direction I, the escape face 38 of the tooth 36 that faces the blocking portion 43 lifts it, and rotation in the direction II is not blocked.

Powering the electromagnet 42 brings the pawl 40 into an inactive position in which it is spaced apart from the sleeve 30 and can no longer co-operate with the tooth 36.

The distances $d_1$ and $d_2$, the first and second stroke portions $C_1$ and $C_2$ of the sleeve 30 on the screw 15, and also the respective widths $l_{37}$ and $l_{43}$ of the blocking face 37 and of the blocking portion 43 of the pawl 40 are selected as a function of the pitch p of the screw 15, of the retracted overtravel $C_{over}$ of the nut 19, and of a predetermined distance $j_{lock}$ so that the pawl in its active state can co-operate with the tooth 36 only after the nut 19 has been moved through the predetermined distance $j_{lock}$ from its third position towards its second position.

The predetermined distance $j_{lock}$ corresponds to functional locking clearance that is necessary for establishing second locking when the main locking device for the movable surface 5 is locked.

In this embodiment, the following conditions should be satisfied:

$$(l_{37}/2)+(l_{43}/2)<p;$$

$$C_1>C_{over}+j_{lock}; \text{ and}$$

$$C_2>(l_{37}/2)+(l_{43}/2).$$

Figure 10:
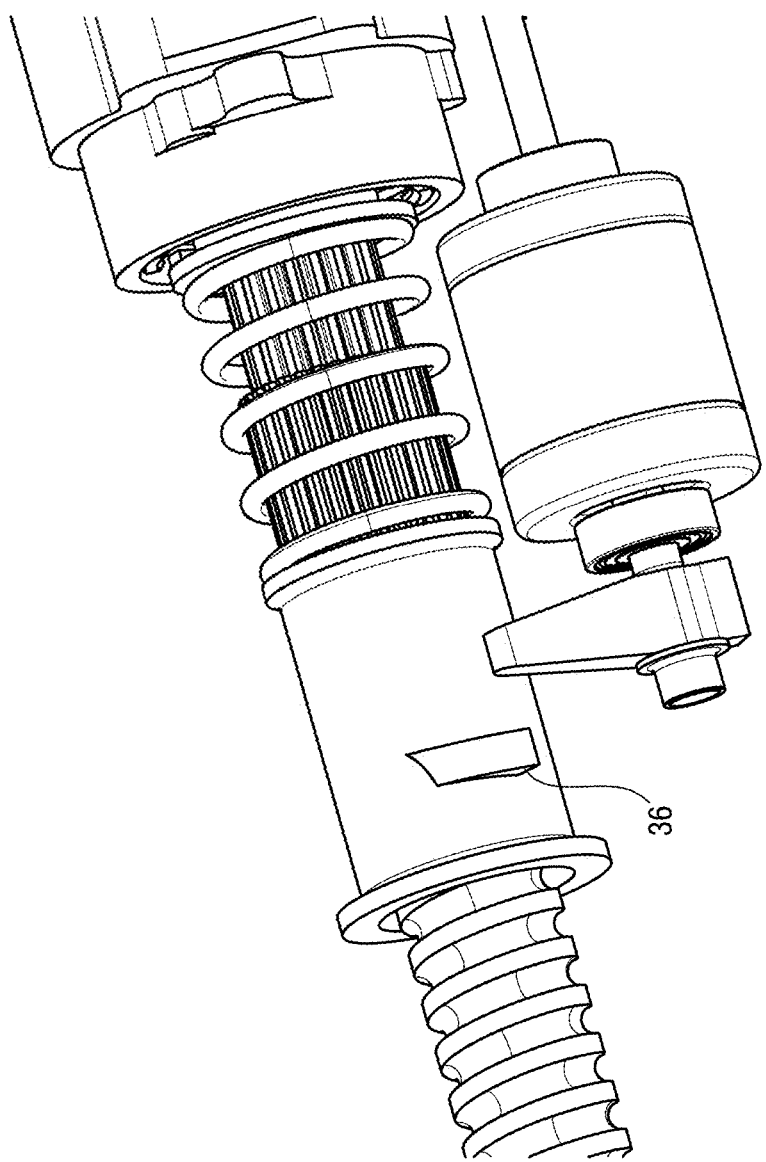
Figure 11:
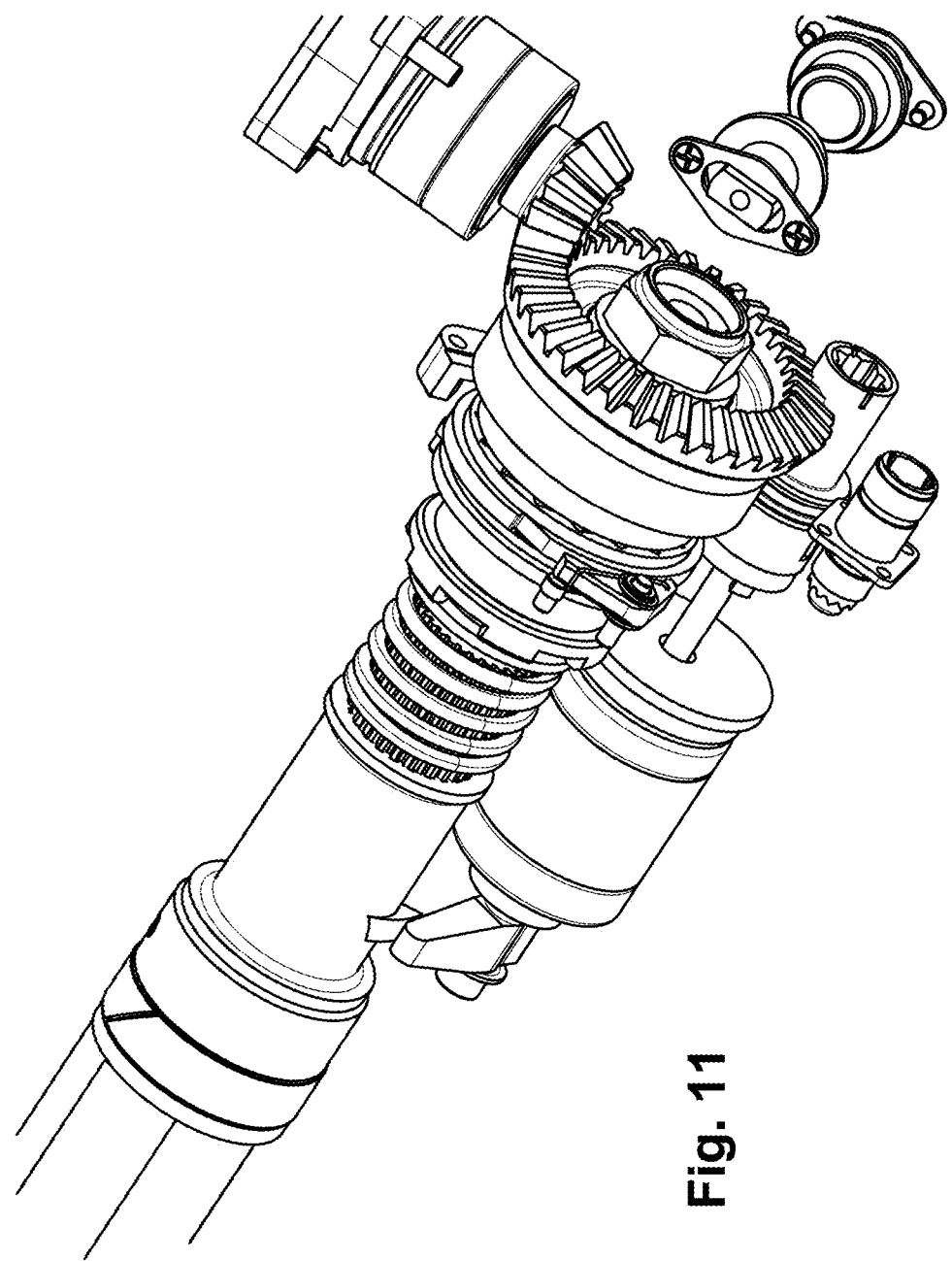
Figure 12:
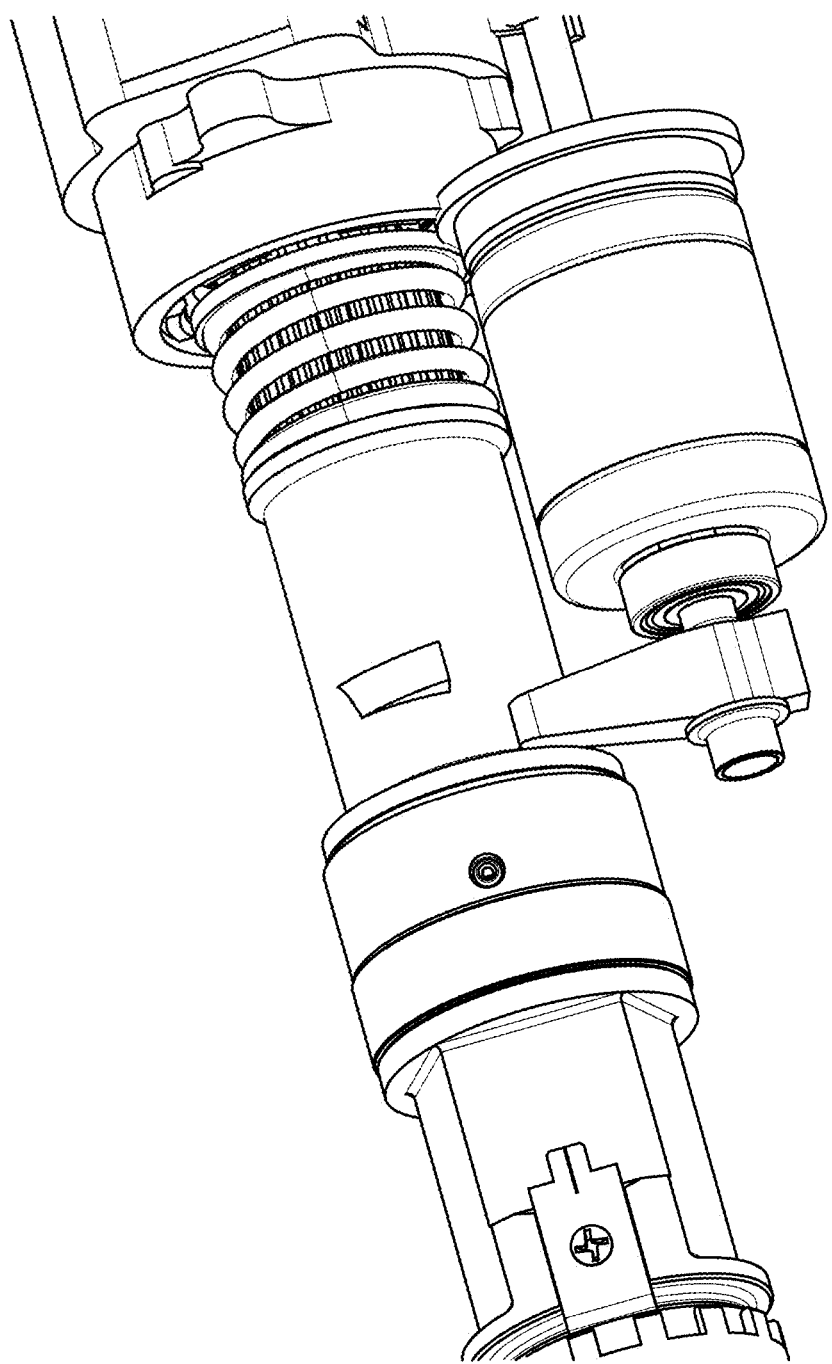

In operation, the nut 19 (and thus the movable surface 5) is initially in its retracted third position as shown in FIG. 4 and the pawl 40 is in an active state. The blocking surface 37 of the tooth 36 is spaced apart from the blocking portion 43 of the pawl 40 by an angular sector $A_{lock}$ equal to $(j_{lock}/P)$. In order to deploy the movable surface 5, the electromagnet 42 is powered so the pawl 40 moves into its inactive state. Thereafter the motor 10 is operated so as to turn the screw 15 in the second direction of rotation II so as to bring the nut 19 towards its over-retracted first position. The pawl 40 is inactive and leaves the sleeve 30 and thus the screw 15 free to rotate. The nut 19 is taken from its retracted third position towards its over-retracted first position. During this movement, the end 19.1 of the nut 19 comes to bear against the shoulder 35 and moves the sleeve 30 against the force from the spring 32. The locks of the main locking device for the movable surface 5 are then caused to disengage. Once these locks have disengaged, the motor 10 is operated to turn the screw 15 in the first direction of rotation I until the nut reaches its deployed second position corresponding to the movable surface 5 being fully open. During this movement, the shoulder 31.3 of the sleeve 30 comes against the abutment 29 of the screw 15 and the end 19.1 of the nut 19 is no longer in contact with the shoulder 35 of the sleeve 30. Once the nut 19 reaches its deployed position, the electromagnet 42 is no longer powered and the pawl 40 returns to its active state. The blocking portion 43 then bears against the sleeve 30 in a position close to the tooth 36 (FIG. 10). The motor 10 is then caused to rotate so that it turns the screw 15 in the second direction of rotation II in order to cause the nut 19 to pass from its deployed second position to its retracted third position. The blocking portion 43 leaves the sleeve 30 (and thus the screw 15) free to rotate and remains in contact with the sleeve 30 without being lifted by the escape face 38 of the tooth 36, thereby limiting wear of the parts associated with the pawl 40. When the nut 19 goes towards its retracted third position (FIG. 7), the end 19.1 of the nut 19 comes into contact with the shoulder 35 of the sleeve 30. During this movement, the nut 19 moves the sleeve 30 against the force of the spring 32, and the escape surface 37 of the tooth 36 lifts the blocking portion 43 of the pawl 40 (FIG. 11), thereby leaving the screw 15 free to turn in the direction II. Once the nut 19 has reached its over-retracted first position (FIG. 12), the locks of the main locking device for the movable surface 5 are caused to engage. The motor 10 is then operated so as to turn the screw 15 in the first direction of rotation I so that the nut 19 goes from its over-retracted first position to its retracted third position shown in FIG. 9. In this position, the blocking portion 43 of the pawl 40 is spaced apart from the blocking face 37 of the tooth 36 by an angular sector $A_{lock}$ and by a longitudinal distance $j_{lock}$. In this configuration, in the event of a failure of the main locking device for the movable surface 5, the force exerted on the movable surface 5 and tending to move the nut 19 from its retracted third position towards its deployed second position causes the screw 15 and the sleeve 30 to turn in the direction I. After turning through an amplitude $A_{lock}$ in the first direction of rotation I, which corresponds to the nut 19 moving through a distance that may be less than one millimeter, the blocking face 37 of the tooth 36 comes to bear against the blocking portion 43 of the pawl 40, thereby preventing the screw 15 from turning and preventing deployment of the movable surface 5.

Figure 13:
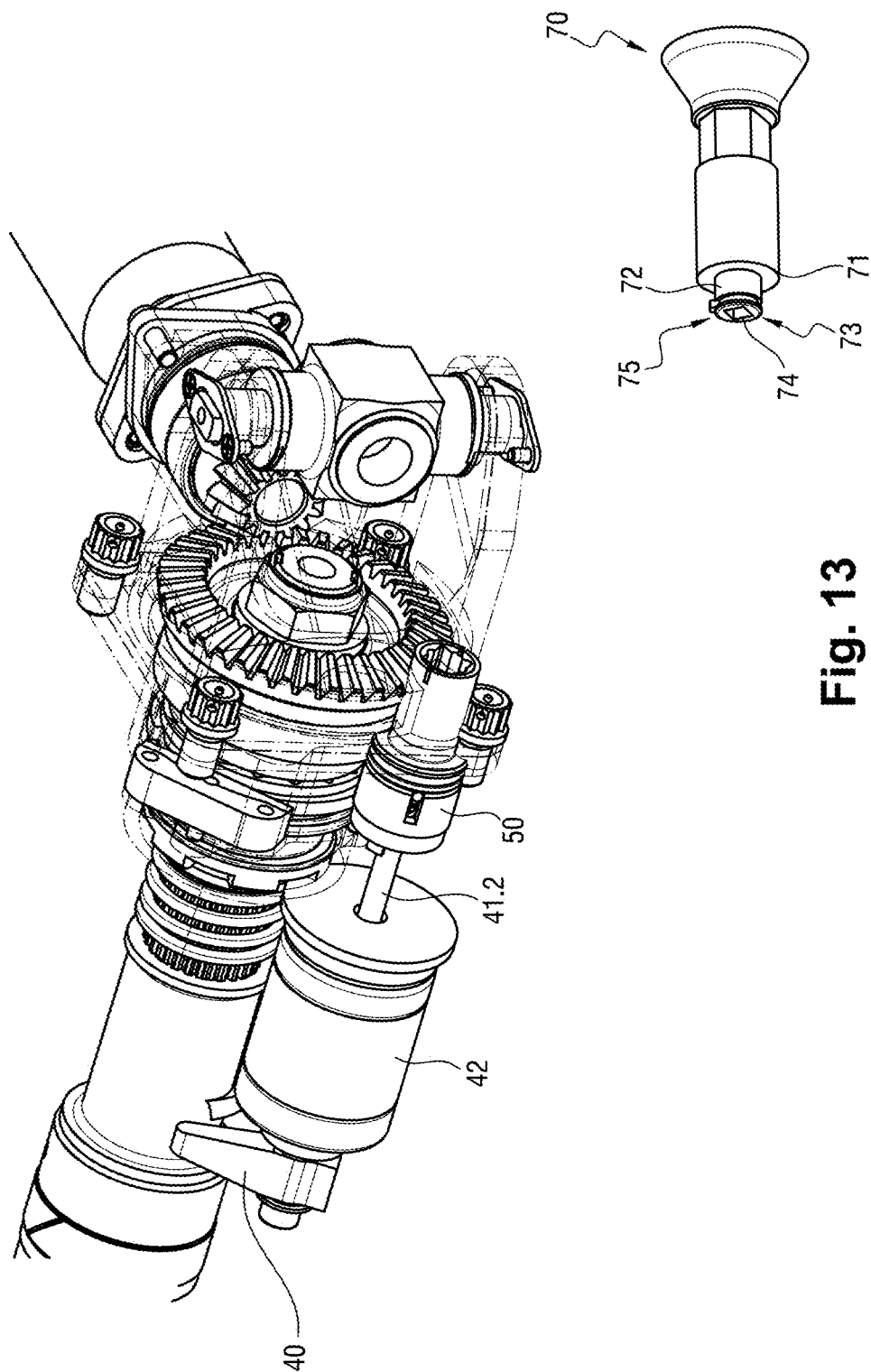
FIG. 13 is a detail view in perspective of the actuator of the invention.
Figure 15:
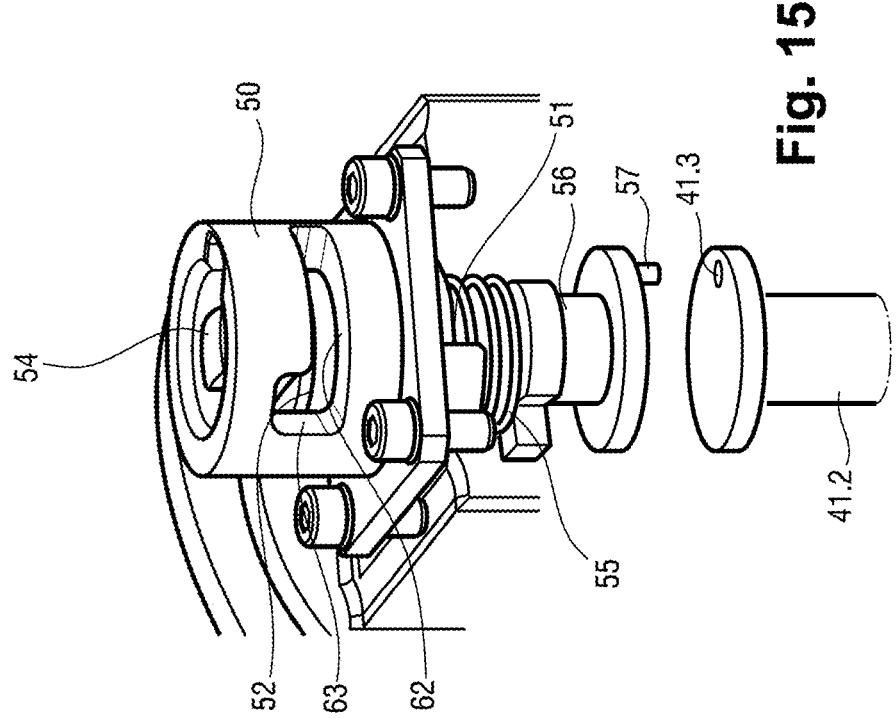
FIGS. 14 and 15 are detail views in perspective of a declutching device of the actuator of the invention.
Figure 14:
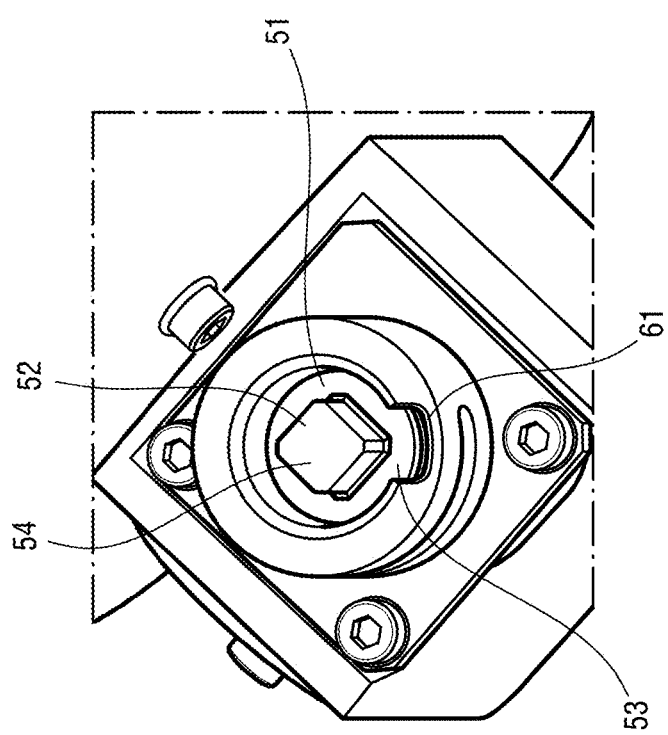

With reference to FIGS. 13 to 15, the grooved bushing 50 is cylindrical in shape and includes at its center a shaft 51 having a first end 52 with an annular shoulder 53 having a square 54 projecting therefrom. A helical compression spring 55 extends between the body 8 and the shoulder 53. The second end 56 of the shaft 51 has a dog 57 facing a corresponding opening 41.3 formed in the second end 41.2 of the shaft 41. As can be seen in FIGS. 14 and 15, the bushing 50 has a bayonet groove with a first segment 61 extending parallel to the longitudinal axis Oy and opening out onto a top surface 58 of the bushing 50. This first segment 61 also opens out into a radial second segment 62 having its end opening out into a blind third segment 63 that is parallel to the first segment 61. The bushing 50 is for co-operating with a key 70 having an end 71 with a cylindrical portion 72 of outside diameter 73 that is substantially less than the inside diameter of the bushing 50. The end 71 of the key 70 has a square socket 74 for co-operating with the square 54. Finally, a stud 75 projects radially from the cylindrical portion 72.

During maintenance operations on the actuator 1, the end 71 of the key 70 is inserted into the bushing 50 so that the stud 75 is engaged in the first segment 61 of the groove 60. The key is then pushed so that the stud 75 enters into the radial second segment 62 of the groove 60. As a result the dog 57 becomes engaged in the opening 41.3 at the same time as the square 54 becomes engaged in the square socket 74. The key 70 is then constrained via the shaft 51 to rotate with the shaft 41. The key 70 is then turned until the stud 75 faces the blind third segment 63. This movement of the key 70 causes the shaft 41 to turn, thereby bringing the pawl 40 into its inactive position. The key 70 is then released and the stud 75 comes into abutment against the end of the blind third segment 63, thereby blocking the key 70 and preventing it from being withdrawn.

It is thus impossible to withdraw the key 70 from the bushing 50 without causing it (and thus the shaft 41.2) to perform movements opposite to those described above, thereby bringing the pawl 40 back into its active position. The use of such a key 70 makes it possible to guarantee that the actuator 1 is indeed locked at the end of maintenance operations, the key 70 possibly also being arranged in such a manner that it is not possible to close the cover of the nacelle until the key is engaged in the bushing 50, thereby further improving the reliability of the locking device of the actuator.

Figure 16:
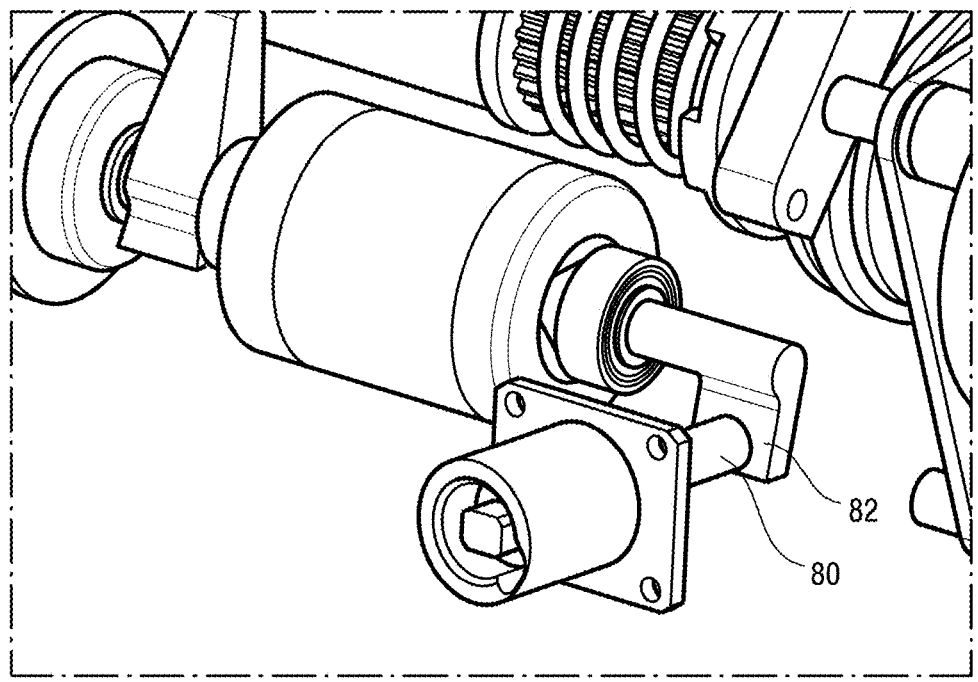
FIG. 16 is a detail view in perspective of a second embodiment of the declutching device of the actuator of the invention.

In a second embodiment shown in FIG. 16, the second end 56 of the shaft 51 has a finger 80 facing a paddle 82 extending radially from the second end 41.2 of the shaft 41.

During maintenance operations on the actuator 1, the end 71 of the key 70 is inserted into the bushing 50 so that the stud 75 is engaged in the first segment 61 of the groove 60. The key 70 is then pushed so that the stud 75 enters the radial second segment 62 of the groove 60. In so doing, the finger 80 moves the paddle 82 of the shaft 41, thereby bringing the pawl 40 into its inactive position. The key 70 is then turned until the stud faces the blind third segment 63. The key 70 is then released and the stud 75 comes into abutment against the end of the blind third segment 63, thereby blocking the key 70 and preventing it from being withdrawn. It is thus impossible to withdraw the key 70 from the bushing 50 without imparting movements thereto that are opposite to those described above so as to bring the pawl 40 into its active position. During operation of the actuator, the finger 80 thus remains at a distance from the paddle 82 while the pawl 42 is in operation, thereby avoiding any friction or mechanical contact, thus improving the robustness of this portion of the actuator.

Figure 17:
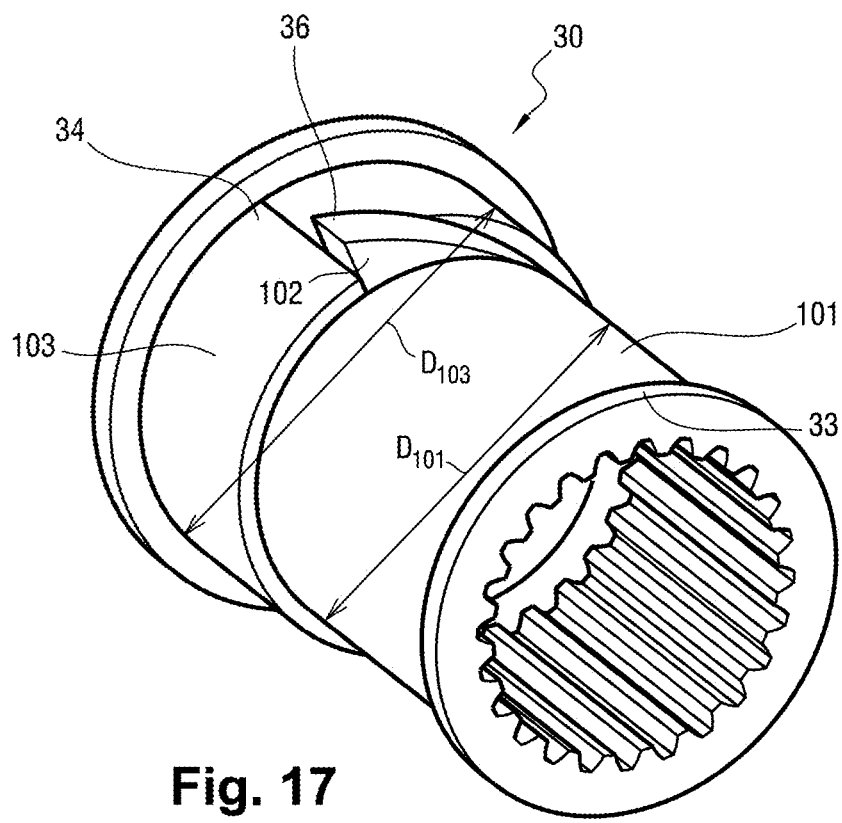
FIG. 17 is a diagrammatic perspective view of an embodiment of a sleeve in a third embodiment of an actuator of the invention.
Figure 18:
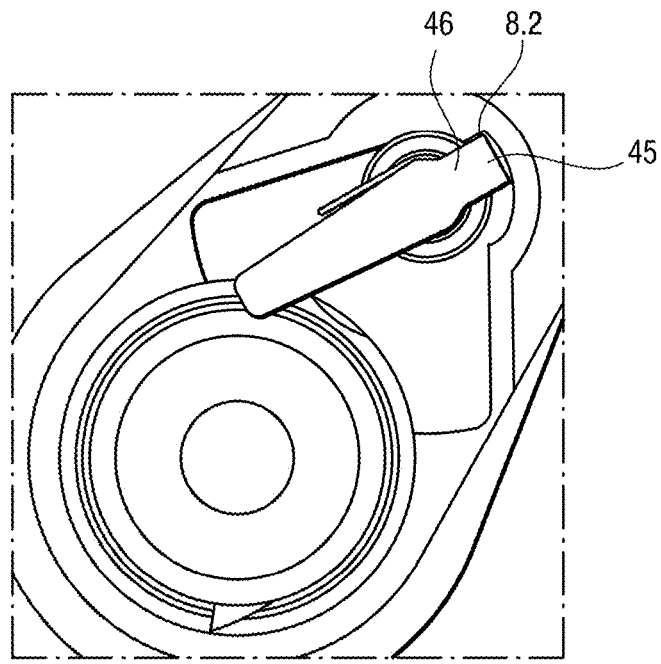
FIG. 18 is a fragmentary diagrammatic cross-section view of the third embodiment of the invention in a first configuration.
Figure 19:
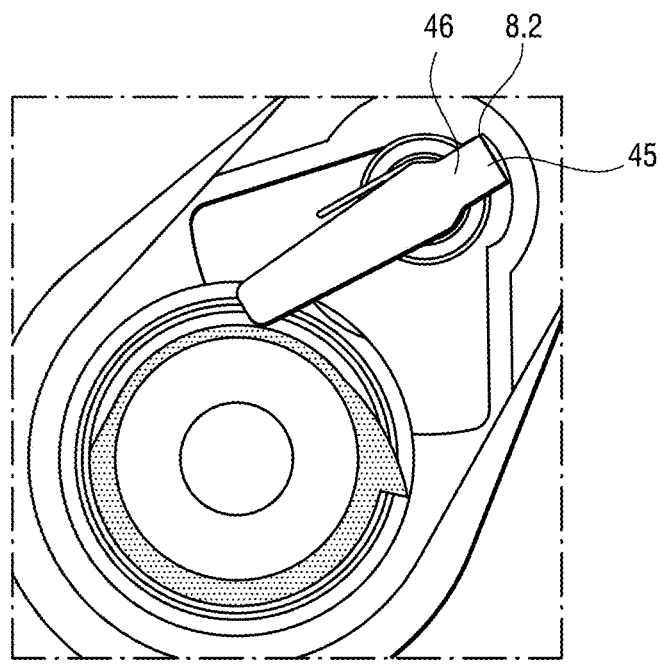
FIG. 19 is a view identical to the view of FIG. 18, in a second configuration.

In a third embodiment, shown in FIGS. 17 to 19, the first portion 101 of the sleeve 30 situated between the first end 33 of the sleeve 30, and the transverse face 102 of the tooth 36 that faces the first end 33 of the sleeve 30 has an outside diameter $D_{101}$ that is less than the outside diameter $D_{103}$ of the second portion 103 of the sleeve 30 that extends between the transverse face 102 of the tooth 36 and the second end 34 of the sleeve 30.

The pawl 40 has an abutment portion 45 situated at its second end 46 remote from the first end 44 of the pawl 40. This abutment portion 45 is arranged to be capable of coming into contact with an abutment 8.2 secured to the body 8 when the pawl 40 is in its active position.

The abutment position 8.2 and the diameters $D_{101}$ and $D_{103}$ are selected in such a manner that, with the pawl 40 being in its active position:

when the blocking portion 43 of the pawl 40 faces the first portion 101 of the sleeve 30, the abutment portion 45 is in contact with the abutment 8.2 and the blocking portion 43 is at a certain distance from the first portion 101 and is then not in contact therewith (FIG. 19); and when the blocking portion 43 of the pawl 40 faces the second portion 103 of the sleeve 30, the blocking portion 43 comes into contact with the second portion 103 and can co-operate with the blocking face 37 or the disengagement face 38 of the tooth 36 (FIG. 18).

Thus, during stages when the nut 19 is passing from its retracted third position—plus the predetermined distance $j_{lock}$—to its deployed second position, the blocking portion 43 of the pawl 40 is not in contact with the sleeve 30 and neither of these two elements is subjected to wear by friction, thereby improving their lifetime.

Naturally, the invention is not limited to the embodiment described but covers any variant coming within the field of application of the invention as defined by the claims.

In particular:

although herein the actuator has a helical spring extending between the body and the sleeve, the invention applies equally to other types of return means for returning the sleeve into position, such as for example Belleville washers or an elastomer sleeve;

although herein the width of the blocking portion of the pawl is substantially equal to the width of the blocking face of the tooth, the invention applies equally to other widths for the blocking portion, e.g. such as the blocking portion having a width that is less than or greater than the width of the blocking face;

although herein the actuator comprises an extension tube having a ball clevis, the invention applies equally to other connection means for connection to an element for moving, e.g. such as a connection rod connected via an eyelet or a pivot;

although herein the pawl co-operates with a tooth, the invention applies equally to other types of obstacle, e.g. such as a notch made in the sleeve;

although herein the nut is connected to a movable surface of a thrust reverser, the invention applies equally to other types of element for moving, e.g. such as an airplane flight control surface;

although herein the declutching actuator comprises an electromagnet, the invention applies equally to other types of declutching actuator, e.g. such as an electric motor;

although herein the operation of the device is described in the form of successive steps, the invention applies equally to steps that take place simultaneously or in some other order;

although herein the extension tube has a ball clevis, the invention applies equally to a ball clevis formed directly with the extension tube;

although herein the body of the actuator has a universal joint hinging the actuator to the nacelle, the invention applies equally to an actuator body having a ball joint hinging the actuator to the nacelle;

although herein the actuator has a ferrule made of bronze, the invention applies equally to other slippery materials, such as polytetrafluoroethylene (PTFE);

although herein the nut has a key that co-operates with the sheath, the invention applies equally to other rotation-preventing means, such as for example ball bushings, or rotation-blocking achieved by the connection between the extension tube and the nacelle;

although herein the device for returning the actuator into position comprises a spring blade, the invention applies equally to other types of return means, e.g. such as a torsion spring or a helical spring; and although herein the screw has a right-handed thread, the invention applies equally to a screw having a left-handed thread, which would imply reversing the directions of rotation of all of the other elements.

The invention claimed is:

1. A lockable actuator comprising:

a body;

a screw mounted on the body to pivot relative to the body about a longitudinal axis (Oy);

a nut provided with connection means for connection to an element to be moved and engaged on the screw so as to move along the screw between an over-retracted first position and a deployed second position on opposite sides of a retracted third position;

a sleeve constrained to rotate with the screw and slidably mounted thereon in order to be moved by the nut; and an obstacle secured to the sleeve and a pawl that is mounted to move on the body and that is connected to a declutching actuator in order to control the pawl to take up an active state and an inactive state, the pawl having a blocking portion for co-operating with the obstacle in order to block turning of the screw in a first direction of rotation when the pawl is in its active state;

the pawl and the obstacle being arranged in such a manner that the pawl in its active state can co-operate with the obstacle only after the nut has been moved through a predetermined distance from its third position towards its second position.

2. The lockable actuator according to claim 1, wherein the declutching actuator has return means for returning it to its active state in the event of the declutching actuator not being powered.

3. The lockable actuator according to claim 1, wherein the declutching actuator comprises an electromagnet.

4. The lockable actuator according to claim 1, wherein the screw includes an abutment limiting movement in translation of the sleeve.

5. The lockable actuator according to claim 1, wherein the sleeve has a grooved portion for co-operating with fluting of the screw.

6. The lockable actuator according to claim 1, including return means for returning the sleeve towards an abutment secured to the screw.

7. The lockable actuator according to claim 6, wherein the return means comprise a helical spring.

8. The lockable actuator according to claim 1, wherein the pawl includes a manual declutching device.

9. The lockable actuator according to claim 1, wherein the sleeve comprises a first portion and a second portion, an outside diameter of the first portion being less than an outside diameter of the second portion.

10. The lockable actuator according to claim 9, wherein the first portion is situated between a first end of the sleeve and a transverse face of the obstacle secured to the sleeve and that faces a first end of the sleeve.

11. The lockable actuator according to claim 1, wherein the sleeve, the pawl, and the declutching actuator are arranged so as to allow the nut to move freely from a position lying between the deployed second position and the retracted third position towards the retracted third position, and to enable the pawl to be automatically in its active state when the nut passes to its retracted third position without any need to power the declutching actuator.

12. A jet nacelle including at least one lockable actuator according to claim 1.

* * * * *